United States Patent
Sun

(10) Patent No.: US 10,049,599 B2
(45) Date of Patent: Aug. 14, 2018

(54) SYSTEM AND METHOD FOR ASSISTING A COLORBLIND USER

(71) Applicant: BOE TECHNOLOGY GROUP CO., LTD., Beijing (CN)

(72) Inventor: Mengmeng Sun, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 0 days.

(21) Appl. No.: 15/122,633

(22) PCT Filed: Oct. 23, 2015

(86) PCT No.: PCT/CN2015/092713
§ 371 (c)(1),
(2) Date: Aug. 30, 2016

(87) PCT Pub. No.: WO2016/184035
PCT Pub. Date: Nov. 24, 2016

(65) Prior Publication Data
US 2017/0154547 A1      Jun. 1, 2017

(30) Foreign Application Priority Data

May 15, 2015   (CN) .......................... 2015 1 0247952

(51) Int. Cl.
*G06K 9/00* (2006.01)
*H04N 9/47* (2006.01)
(Continued)

(52) U.S. Cl.
CPC ............ *G09B 21/008* (2013.01); *G06T 5/009* (2013.01); *G06T 11/60* (2013.01); *G09B 21/006* (2013.01);
(Continued)

(58) Field of Classification Search
CPC ............................. G06T 11/001; H04N 1/6075
See application file for complete search history.

(56) References Cited

U.S. PATENT DOCUMENTS

2007/0024877 A1* 2/2007 Osumi .................. G06T 11/001
358/1.9
2007/0273708 A1* 11/2007 Andreasson .......... G06T 11/001
345/593
(Continued)

FOREIGN PATENT DOCUMENTS

| CN | 101783964 A | 7/2010 |
| CN | 101889921 A | 11/2010 |

(Continued)

OTHER PUBLICATIONS

Office Action in Chinese Application No. 201510247952.8 dated Feb. 24, 2017, with English translation. 13 pages.
(Continued)

*Primary Examiner* — Rebecca Volentine
(74) *Attorney, Agent, or Firm* — Womble Bond Dickinson (US) LLP

(57) ABSTRACT

The disclosure proposes a system and method for assisting a colorblind user. The system comprises: a perspective display device for displaying an electronic image and/or allowing the user to view an actual image through the perspective display device; an image acquisition device for acquiring an electronic image corresponding to an actual image which can be viewed through the perspective device; and a processing system for, when the current processing mode of the system is a first display mode, processing the electronic image acquired by the image acquisition device to obtain a processed electronic image, and superimposing the processed electronic image on an actual image viewed through the perspective display device in a way of being aligned with the actual image and displaying it; wherein the
(Continued)

processing the electronic image comprises: conducting an HSV space transformation for a target part in the electronic image corresponding to an area of a color in the actual image which can not be distinguished.

18 Claims, 2 Drawing Sheets

(51) Int. Cl.
    *H04N 7/18*     (2006.01)
    *A61B 3/02*     (2006.01)
    *G09B 21/00*     (2006.01)
    *G06T 11/60*     (2006.01)
    *H04N 9/64*     (2006.01)
    *G06T 5/00*     (2006.01)

(52) U.S. Cl.
CPC ............. *H04N 9/643* (2013.01); *H04N 9/646* (2013.01); *G06T 2207/10024* (2013.01); *G06T 2207/20208* (2013.01)

(56) References Cited

U.S. PATENT DOCUMENTS

| | | | | |
|---|---|---|---|---|
| 2011/0043644 A1* | 2/2011 | Munger | ............... | G02B 27/017 348/207.1 |
| 2011/0229023 A1* | 9/2011 | Jones | ............... | G06T 11/001 382/162 |
| 2011/0293177 A1* | 12/2011 | Wang | ............... | A61B 3/066 382/167 |
| 2012/0147163 A1* | 6/2012 | Kaminsky | ............... | G09G 5/028 348/62 |
| 2012/0212593 A1* | 8/2012 | Na'aman | ............... | G06K 9/00671 348/62 |
| 2013/0194389 A1* | 8/2013 | Vaught | ............... | G02B 27/017 348/47 |
| 2014/0015850 A1* | 1/2014 | Ahn | ............... | H04N 1/60 345/594 |
| 2014/0340644 A1* | 11/2014 | Haine | ............... | A61B 3/066 351/239 |
| 2014/0355874 A1* | 12/2014 | Sakamaki | ............... | H04N 1/622 382/165 |
| 2015/0287345 A1* | 10/2015 | Tanuwidjaja | ............... | G09B 21/008 348/62 |
| 2016/0005335 A1* | 1/2016 | Alsadah | ............... | G09B 21/007 340/4.12 |
| 2016/0104453 A1* | 4/2016 | Borenstein | ............... | G09G 5/02 348/62 |

FOREIGN PATENT DOCUMENTS

| | | |
|---|---|---|
| CN | 102402367 A | 4/2012 |
| CN | 103778602 A | 5/2014 |
| CN | 104268508 A | 1/2015 |
| CN | 104270588 A | 1/2015 |
| CN | 104794700 A | 7/2015 |
| CN | 205121651 U | 3/2016 |
| JP | 2010056799 A | 3/2010 |

OTHER PUBLICATIONS

Zhou. "The Research on Computer Aided Color Design System for the Color Blind." Journal of Xi'an Tech. Univ., vol. 29, No. 3 (Jun. 2009). 5 pages.

International Search Report and Written Opinion in PCT/CN2015/092713 dated Jan. 18, 2016, with English translation. 13 pages.

Office Action in Chinese Application No. 201510247952.8 dated Jul. 26, 2017, with English translation. 13 pages.

* cited by examiner

SYSTEM AND METHOD FOR ASSISTING A COLORBLIND USER

FIELD OF THE INVENTION

The disclosure relates to a wearable device, and in particular, to a system for assisting a colorblind user.

BACKGROUND OF THE INVENTION

The congenital color vision disorder is generally called colorblindness, which can not distinguish various colors or certain color(s) in the natural spectrum. The colorblindness is divided into total colorblindness and partial colorblindness (red colorblindness, green colorblindness, blue-yellow colorblindness, etc.). The total colorblindness belongs to complete cone cell dysfunction, and it is the most severe color vision disorder. The red colorblindness and the green colorblindness in the partial colorblindness are called red-green colorblindness.

The red-green colorblindness brings about a lot of inconvenience to a patient himself/herself, for example, it is not easy for him to identify traffic lights and other signs, he is deprived of qualifications of occupations that require sensitive color vision, the patient's perception of the colorful world will be affected, and yet such a congenital deficiency can not be healed in posteriority. Nowadays, there still lacks a system which may more effectively assist a colorblind user in normal identification.

SUMMARY OF THE INVENTION

Therefore, there is a need for a solution which can solve at least one of the above problems.

According to an aspect of the disclosure, there is provided a system for assisting a colorblind user. The system comprises: a perspective display device for displaying an electronic image and/or allowing the user to view an actual image through the perspective display device; an image acquisition device for acquiring an electronic image corresponding to an actual image which can be viewed through the perspective device; and a processing system for, when the current processing mode of the system is a first display mode, processing the electronic image acquired by the image acquisition device to obtain a processed electronic image, and superimposing the processed electronic image on an actual image viewed through the perspective display device in a way of being aligned with the actual image and displaying it, wherein the processing the electronic image comprises: conducting an HSV space transformation for a target part in the electronic image corresponding to an area of a color in the actual image which can not be distinguished. HSV is the abbreviation of Hue, Saturation and Value, wherein a way of the HSV space transformation comprises at least:

$$y_1=2/3(360-x)+45, x \in [315,360];$$

$$y_2=2/3x+45, x \in [0,45];$$

$$y_3=5/6x+102.5, x \in [75,165];$$

wherein the range of the red hue is [315, 360] and [0, 45], the range of the green hue is [75, 165], $y_1$, $y_2$ and $y_3$ are the hues of the pixels of the target part in the processed electronic image, and x is the hue of a pixel of the target part in the electronic image.

According to another aspect of the disclosure, there is provided a method for assisting a colorblind user. The method comprises the following steps of: acquiring an electronic image corresponding to an actual image which can be viewed through a perspective display device; when the current processing mode is a first display mode, processing the electronic image to obtain a processed electronic image; and superimposing the processed electronic image on an actual image viewed through the perspective display device in a way of being aligned with the actual image and displaying it on the perspective display device; wherein the processing the electronic image comprises: conducting an HSV space transformation for a target part in the electronic image corresponding to an area of a color in the actual image which cannot be distinguished, wherein a way of the HSV space transformation comprises at least:

$$y_1=2/3(360-x)+45, x \in [315,360];$$

$$y_2=2/3x+45, x \in [0,45];$$

$$y_3=5/6x+102.5, x \in [75,165];$$

wherein the range of the red hue is [315, 360] and [0, 45], the range of the green hue is [75, 165], $y_1$, $y_2$ and $y_3$ are the hues of the pixels of the target part in the processed electronic image, and x is the hue of a pixel of the target part in the electronic image.

This Summary is provided to introduce a selection of concepts in a simplified form that are further described below in the Detailed Description. This Summary is not intended to identify key features or essential features of the claimed subject matter, nor is it intended to be used to help determining the scope of the claimed subject matter.

The colorblindness assisting system according to the disclosure has characteristics of high usability, high integration and portability, etc., and can improve the user experience with the greatest possibility.

BRIEF DESCRIPTION OF THE DRAWINGS

Now, the disclosure will be described more specifically with reference to the following drawings, in which.

DETAILED DESCRIPTION OF THE INVENTION

In the following embodiments of the disclosure will be more fully described with reference to the drawings, in which the embodiments of the disclosure are shown.

However, the disclosure may be practiced in many different forms, and the disclosure should not be understood as limited to the embodiments set forth herein. Like signs are used to denote like elements throughout the document.

The terms used herein are only for the purpose of describing specific embodiments, but not intended to limit the application. As used herein, "a", "an" or "the" in the singular forms is intended to comprise the plural forms as well, unless otherwise indicated clearly in this context. It should be further understood that as used herein, the term "comprise" specifies the occurrence of a stated feature, bulk, step, operation, element and/or component, but does not exclude the occurrence or addition of one or more other feature, bulk, step, operation, element, component and/or group thereof.

Unless otherwise defined, the terms (comprising technical terms and scientific terms) used herein have the same meanings as those commonly understood by the person of ordinary skills in the art that the disclosure pertains to. The terms used herein should be interpreted to have the meanings consistent with those in the context of the specification and the related art, and may not be interpreted with idealized or overly formal meanings, unless so defined deliberately herein.

In the following, the disclosure will be described with reference to a block diagram and/or a flow chart showing a method, device (system) and/or computer program product according to an embodiment of the disclosure. It should be appreciated that, the disclosure may be embodied in hardware and/or software (comprising firmware, resident software, microcode, etc.). Still further, the disclosure may take the form of a computer program product on a computer usable or computer readable storage medium, which has a computer usable or computer readable program code implemented in a medium, to be used by an instruction execution system or used in combination with an instruction execution system. In the context of the disclosure, the computer usable or computer readable medium may be any medium, which may contain, store, communicate, transmit, or transfer a program, to be used by an instruction execution system, device or apparatus, or used in combination with an instruction execution system, device or apparatus.

In the following, the technical solutions provided by the embodiments of the disclosure will be described in detail in connection with the drawings.

According to an embodiment of the disclosure, there is provided a system for assisting a colorblind user.

Figure 1:
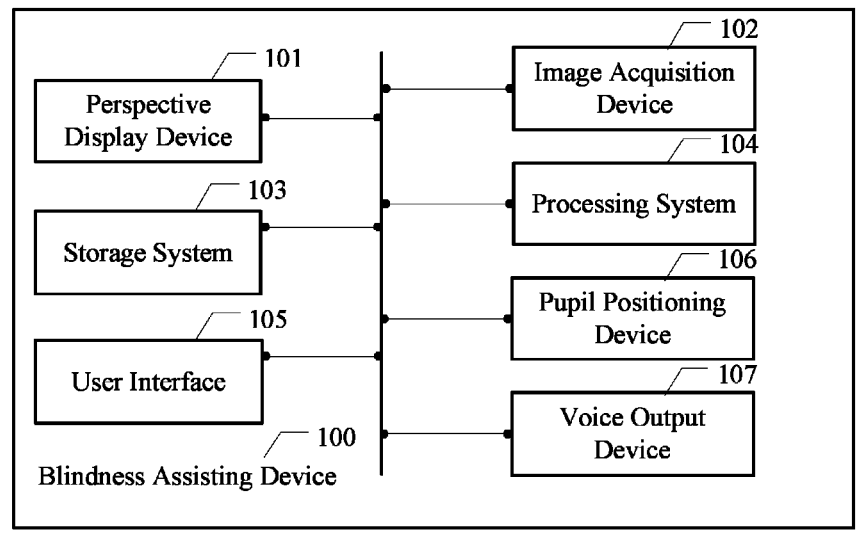
FIG. 1 depicts exemplarily a block diagram of a blindness assisting system 100 according to one or more embodiment of the disclosure.

FIG. 1 depicts exemplarily a block diagram of a blindness assisting system 100 according to one or more embodiment of the disclosure. The blindness assisting system 100 as shown in FIG. 1 comprises a perspective display device 101, an image acquisition device 102, a storage system 103 and a processing system 104.

In some embodiments, the perspective display device 101 may be a wearable device. For example, the wearable device is glasses, goggles, or a helmet, etc.

In some embodiments, for example, when the perspective display device 101 is transparent glasses, the perspective display device 101 is used for displaying an actual image under the operation of a user, and the user may view the actual image through the perspective display device 101.

In some implementations, for example, when the perspective display device 101 is a display, in addition to being able to achieve the above function, it is further used for displaying an electronic image, and the user may view the electronic image displayed on the perspective display device 101.

In other words, in the embodiment of FIG. 1, the perspective display device 101 may be used as transparent glasses, or also may be used as a display, or further may be used as a combination of the two.

The image acquisition device 102 is typically a camera, or called a video camera, which is used for acquiring an electronic image corresponding to an actual image which can be viewed through the perspective display device 101.

The storage system 103 comprises one or more computer usable or computer readable storage medium capable of storing data and/or computer executable instructions. It is to be appreciated that the storage medium is preferably a nonvolatile storage medium. The storage system 103 is used for storing information associated with the colorblindness assisting system 100, for example, at least used for storing data such as an electronic image acquired by the image acquisition device 102, and an instruction of processing the data, etc.

The processing system 104 comprises one or more processing unit. The processing unit is a physical apparatus or article comprising one or more integrated circuit, which reads stored data and instructions from a computer readable medium such as the storage system 103 and selectively executes the instructions. In individual embodiments, the processing system 104 is embodied in various ways. For example, the processing system 104 may be embodied as one or more processing core. In another example, the processing system 104 may comprise one or more independent microprocessor. In another example, the processing system 104 may comprise an integrated circuit (ASIC) providing a specific function. In an example, the processing system 104 provides a specific function by using an ASIC and executing computer executable instructions. In an example, the functions of the processing system 104 will be discussed in detail in a flow of a method elucidated in connection with FIG. 3.

Alternatively or optionally, the colorblindness assisting system further comprises a user interface 105. The user interface may be constructed by employing a knob, a button, etc. In an embodiment, the user interface 105 is used for receiving an instruction of fine adjusting the colorblindness assisting system 100 inputted by the user. For example, the user may perform adjustment of reduction on hues of a specific area in a processed image in a range of 1-10 degrees. The processing system of the colorblindness assisting system 100 will perform corresponding processing in response to this input of the user. In some implementations, for example, the user interface 105 is used for selecting processing modes of the colorblindness assisting system 100, the user's selecting a certain processing mode corresponds to a piece of input information of the user, the input information may be stored in the storage system 103, and then information stored by the storage system 103 and associated with the colorblindness assisting system 100 further comprises the input information of the user.

In some implementations, the processing modes selectable to the user may comprise at least a first display mode, a second display mode and a broadcast mode, etc. In some implementations, a way of selecting a processing mode may comprise different gestures (e.g., click, double click, and long press represent selection of a processing mode therein, respectively), or also a default mode may be set (for example, the first display mode is by default right after boot), or the like. The discussion regarding these processing modes will be described in detail in the following embodiment in connection with FIG. 3.

Alternatively or optionally, the colorblindness assisting system further comprises a pupil positioning device 106, which is used for tracing the convergence point of the lines of sight of the left and/or right eye of the user so as to determine the focal plane, such that the image acquisition device 102 acquires an image of the plane, and the processing system 104 performs coordinate matching for an image displayed by the perspective display device 104 and an actual image viewed through it at least partially based on the positioned convergence point and the pupil position, thereby aligning the two. The essence of the coordinate matching is to eliminate the difference between the acquired image and the viewed image resulting from the difference between the human eye pupil position and the position of the image acquisition device 102. When the pupil position, the above convergence point, and the relative position of the image acquisition device are obtained, it may be possible to compute the coordinate difference between the image acquired by the image acquisition device 102 and the actual image viewed by the human eyes, and then align the acquired image with the actual image viewed by the human eyes by transforming an image in one coordinate system into one in another coordinate system, so as to eliminate the difference. When the image acquisition device 102 and the perspective display device 101 are located in the same plane, the difference may be eliminated just by the translation transformation, and otherwise, scaling of the image may be involved.

In some implementations, for example, the colorblindness assisting further comprises a voice output device 107 for outputting voice information in the form of voice. The outputting voice information may be voice information related with a color identified by the processing system, or informing the user of a current processing mode in response to the selection of the current processing mode by the user, or prompting the user to perform other operations, or the like. In an embodiment, the voice output device 107 is a bone conduction headphone. It may be appreciated that the above mentioned information associated with the colorblindness assisting system 100 may further comprise a variety of voice output content.

Figure 2:
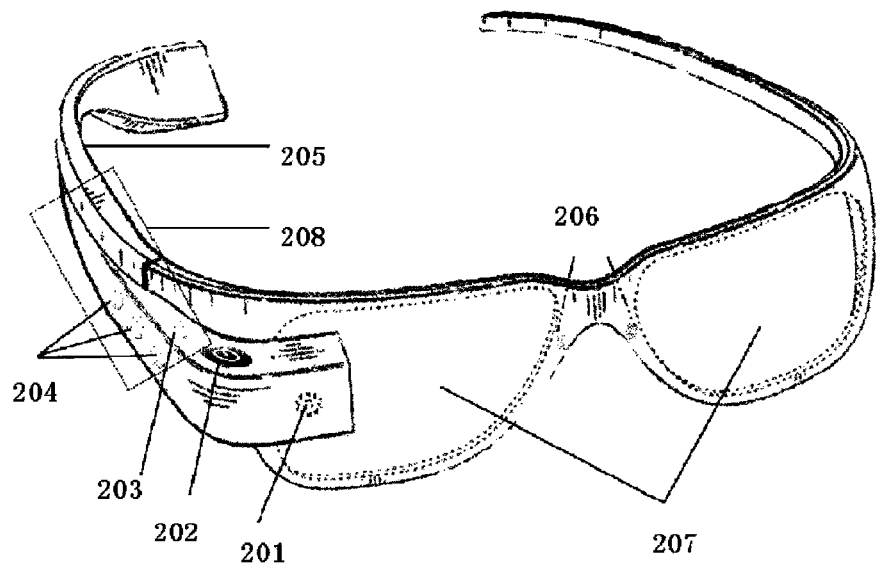
FIG. 2 depicts exemplarily a schematic diagram of a blindness assisting system according to one or more embodiment of the disclosure.

FIG. 2 depicts exemplarily an appearance diagram of a blindness assisting system according to one or more embodiment of the disclosure. The blindness assisting system comprises an image acquisition device 201 (which is typically a camera, or called video camera), a power switch 202, a mode selection button 203 as a first user interface, a manual adjustment knob 204 (in the illustrated example are set 3 ones, which are targeted at the individual components involved in the HSV space transformation, respectively, namely, hue, saturation, brightness) as a second user interface, a voice output device 205 (which is a bone conduction headphone in one example), two pupil positioning devices 206 (which are used for positioning two pupils, respectively), a perspective display device 207 (which is typically two transparent lenses having the display function) and an internally integrated processing system 208. In some implementations, for example, a processing system may also be integrated into a part on another glasses leg symmetrical to 208.

It needs to be noted that the arrangement of FIG. 2 is just one example of the appearance of the colorblindness assisting system according to the disclosure. In fact, the arrangement may be varied according to a different implementation of the colorblindness assisting system. For example, the shape may be changed, the manifestation may be in other form of a helmet, goggles, etc., and the positions and numbers of individual functional components may be changed, and the like.

Figure 3:
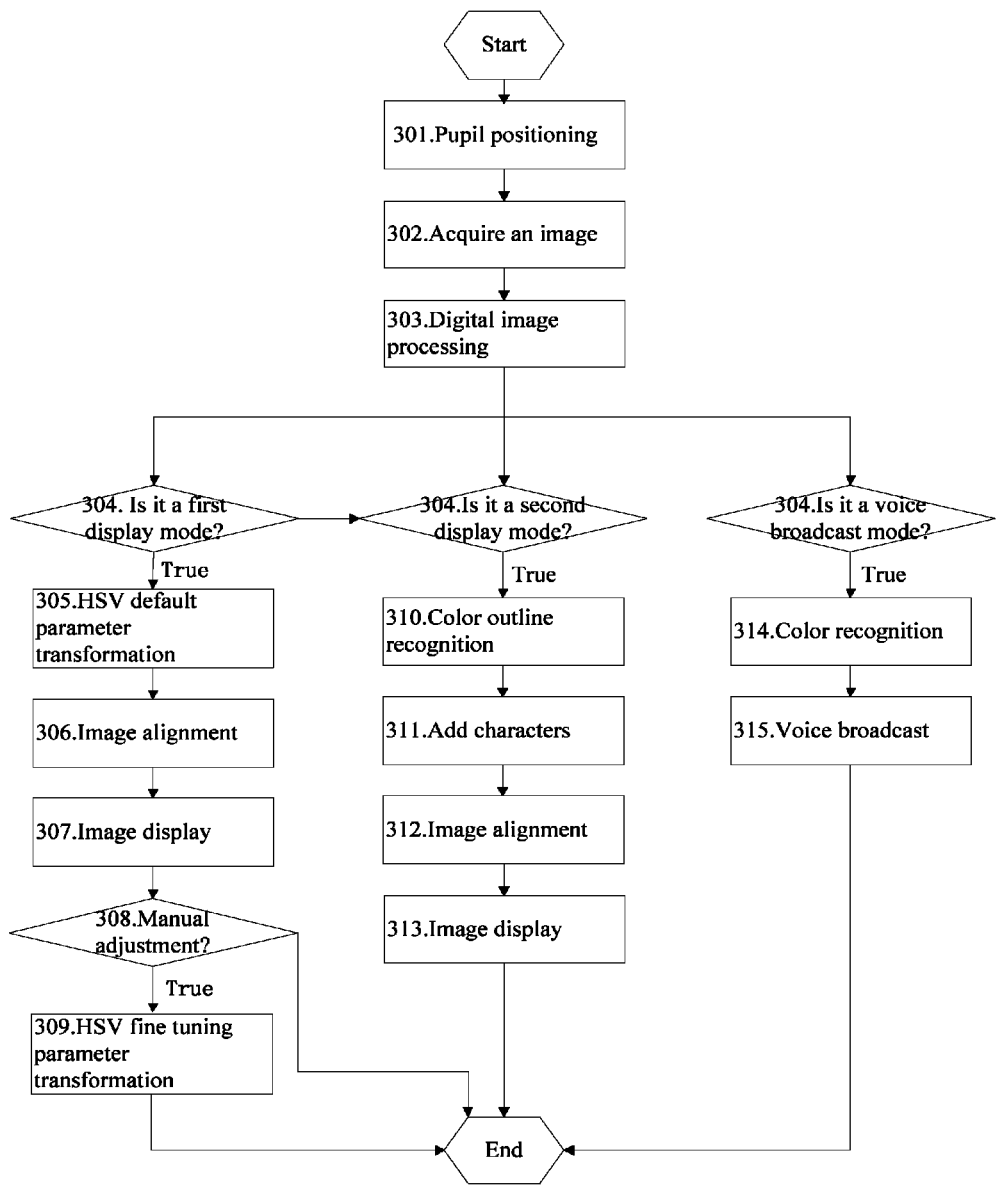
FIG. 3 depicts exemplarily a work flow chart of a blindness assisting system according to one or more embodiment of the disclosure.

FIG. 3 depicts exemplarily a work flow chart of a blindness assisting system according to one or more embodiment of the disclosure, which comprises individual steps described in the following.

First, at step 301, the two pupil positioning devices 106 trace the left and/or right eye to position the convergence point of the lines of sight of the left and/or right eye of a user so as to determine the focal plane. In some cases, for example, in which the user is blind in one eye, the eye will not be traced any more. It needs to be noted that for some situations, for example, in case of traffic lights, the system may automatically determine the focal plane (for example, the plane where the traffic lights are located) without the need for determining the focal plane by tracing the left and/or right eye.

Next, at step 302, the image acquisition device 102 acquires an electronic image based on the determined focal plane. In a digitization dominant environment, what is acquired is usually a digitized image. If what is acquired is an analog image, analog/digital conversion may be conducted as appropriate. Next, at step 303, digital image processing is performed, for example, image filtering, enhancement, etc. If what is acquired by the image acquisition device 102 is an analog image, the step 303 may further comprise the analog/digital conversion. At step 304, the processing system 104 determines a current processing mode of the system. This may be determined according to the default setting of the system, or also may be determined according to an input of the user via the user interface 105.

In a case in which the current processing mode of the system is the first display mode, the processing system 104 processes the acquired electronic image at step 305. In particular, an HSV space transformation with the default parameters of the system is conducted for a target part in the electronic image corresponding to an area of a color in the actual image which can not be distinguished, to form a processed electronic image. It needs to be noted that, in this document, the target part in the electronic image corresponding to an area of a color which can not be distinguished may be a part in a narrow sense and only comprising a color such as red color, green color, etc., which a colorblind user can not distinguish, or also may be a generalized part, which comprises this part and is greater, or even whole of the acquired image. The HSV space transformation of the generalized target may be such that the colors of the transformed image are more coordinated. Therein, a way of the HSV space transformation is as follows.

$$y_1 = 2/3(360-x)+45, x \in [315, 360); \quad (1)$$

$$y_2 = 2/3x+45, x \in [0, 45]; \quad (2)$$

$$y_3 = 5/6x+102.5, x \in [75, 165]; \quad (3)$$

wherein suppose that the range of the red hue is [315, 360] and [0, 45], the range of the green hue is [75, 165], $y_1$, $y_2$ and $y_3$ are the hues of the pixels of the target part in the processed electronic image, and x is the hue of a pixel of the target part in the electronic image.

Additionally or optionally, it may further be possible to perform outline recognition and color recognition on a color in the target part which can not be distinguished, and mark the color within the outline in a clear way inside or outside the outline. The clear way may be to mark with characters different from the color within the outline, or to mark outside the outline, or the like (not shown in the figure).

Additionally or optionally, it may further be possible to perform color recognition on a color in the target part which can not be distinguished, and then output it to the user in the form of voice via the voice output device (e.g., a bone conduction headphone) (not shown in the figure).

To improve the user experience, at step 306, the processing system 104 aligns the processed electronic image with the actual image viewed through the perspective display device (for example, by the above discussed coordinate matching), and then at step 307, superposes the processed electronic image on the actual image and displays it via the perspective display device 101. It needs to be noted that, in some implementations, for example, the alignment step may not be performed, and the display is directly conducted, and the user may determine an area of a color which can not be distinguished by comparing the processed electronic image and the actual image by himself. The deficiency lies in that the two images will overlap partially, which will affect the viewing effect.

If at step 308 it is detected that the user conducts manual adjustment via the user interface 105, then at step 309, the processing system 104 conducts an HSV fine tuning parameter transformation according to the manual adjustment. The HSV fine tuning parameter transformation comprises conducting reduction of 1-10 degrees of $y_1$, $y_2$ and $y_3$ in the above equations (1)-(3), and adjusts the brightness and/or saturation according to the user input.

In a case in which the current processing mode of the system is the second display mode independent of the other modes, the processing system 104 processes the acquired electronic image. In particular, at step 310, outline recognition and color recognition are performed on a color in the target part which can not be distinguished, and at step 311, the color within the area is marked in a clear way inside or outside the outline, to form a processed electronic image. The clear way may be to mark with characters different from the color of the outline, or also may be to overlap the color within the area with the default color or pattern and then mark characters thereon, or to mark outside the outline, or the like. At step 312, the processing system 104 aligns the processed electronic image with the actual image viewed through the perspective display device (for example, by the above discussed coordinate matching), and then at step 313, superposes the processed electronic image on the actual image and displays it via the perspective display device 101. It needs to be noted that, in some implementations, for example, the alignment step may not be performed, and the display is directly conducted, and the user may determine an outline of a color which can not be distinguished by comparing the processed electronic image and the actual image by himself. The deficiency lies in that the two images will overlap partially, which will affect the viewing effect.

Additionally or optionally, it may further be possible to perform color recognition on an area of a color therein which can not be distinguished, and then output it to the user in the form of voice via the voice output device (e.g., a bone conduction headphone) (not shown in the figure).

In a case in which the current processing mode of the system is the broadcast mode independent of the other modes, the processing system 104 processes the acquired electronic image, performs color recognition on a color in the target part which can not be distinguished at step 314, and then output it to the user in the form of voice via the voice output device (e.g., a bone conduction headphone) at step 315. This mode is particularly adapted for a scenario in which a colorblind user crosses the road, which may inform the user for example of "red light is on, and forward is prohibited!"

It needs to be noted that for the above steps discussed in connection with FIG. 3, the order in which they are performed is not defined, except for those of which the implementation is on the premise of the result of a preceding step.

The colorblindness assisting system according to the disclosure has characteristics of high usability, high integration and portability, etc., and can improve the user experience with the greatest possibility.

Although the disclosure has been described in connection with the specific embodiments, the skilled in the art will be appreciated that many changes and modifications may be made, and equivalent replacement may be conducted for its elements, without departing from the true scope of the disclosure. In addition, many modifications may be made to adapt the teachings of the disclosure to specific situations, without departing from its central scope. Therefore, the disclosure is not limited to the specific embodiments herein disclosed as the best modes contemplated to implement the disclosure, and on the contrary, the disclosure comprises all embodiments falling within the scope of the appended claims.

The invention claimed is:

1. A system for assisting a colorblind user, comprising:
   a perspective display device for displaying an electronic image and/or allowing the user to view an actual image through the perspective display device;
   an image acquisition device for acquiring an electronic image corresponding to an actual image which can be viewed through the perspective display device; and
   a processing system for, when a current processing mode of the system is a first display mode, processing the electronic image acquired by the image acquisition device to obtain a processed electronic image, and superimposing the processed electronic image on an actual image viewed through the perspective display device in a way of being aligned with the actual image and displaying it, wherein the processing the electronic image comprises: conducting an HSV space transformation for a target part in the electronic image corresponding to an area of a color in the actual image which can not be distinguished;
   wherein a way of the HSV space transformation comprises at least:

$y_1=2/3(360-x)+45, x \in [315,360)$;

$y_2=2/3x+45, x \in [0,45]$;

$y_3=5/6x+102.5, x \in [75,165]$;

wherein the range of the red hue is [315, 360] and [0, 45], the range of the green hue is [75, 165], $y_1$, $y_2$ and $y_3$ are the hues of the pixels of the target part in the processed electronic image, and x is the hue of a pixel of the target part in the electronic image.

2. The system as claimed in claim 1, wherein the processing the electronic image further comprises marking the color of the target part with characters.

3. The system as claimed in claim 1, wherein
   the system further comprises a first user interface, wherein the processing system is further configured to conduct reduction of 1-10 degrees of $y_1$, $y_2$ and $y_3$ in response to a fine adjustment instruction of the user received via the first user interface; and/or
   the processing system is further configured to adjust the brightness and/or saturation in response to the received fine adjustment instruction of the user.

4. The system as claimed in claim 1, wherein the processing system is further used for, when the current processing mode of the system is a second display mode independent of other modes, processing the electronic image acquired by the image acquisition device to obtain a processed electronic image, and superimposing the processed electronic image on an actual image viewed through the perspective display device in a way of being aligned with the actual image and displaying it, wherein the processing the electronic image is:
   marking the color of the target part with characters.

5. The system as claimed in claim 2, wherein the characters are marked inside or outside an outline of the color in the target part.

6. The system as claimed in claim 1, wherein the system further comprises a pupil positioning device for tracing the convergence point of the lines of sight of the left and/or right eye of the user so as to determine the focal plane, such that the image acquisition device acquires an image of the focal plane, and the system performs coordinate matching for an image displayed by the perspective display device and an actual image viewed through it at least partially based on the positioned convergence point and the pupil position positioned by the pupil positioning device, thereby aligning the two.

7. The system as claimed in claim 4, wherein the system further comprises a voice output device, wherein the processing system is further used for, in a case in which the current processing mode of the system is the first display mode, the second display mode or a broadcast mode independent of the other modes, recognizing a color in the electronic image which can not be distinguished and outputting it to the user in the form of voice via the voice output device.

8. The system as claimed in claim 7, wherein the voice output device is a bone conduction headphone.

9. The system as claimed in claim 1, further comprising a second user interface, wherein the second user interface is further used for recognizing selection of the current processing mode by the user by recognizing different gestures of the user, so that the processor performs corresponding processing.

10. A method for assisting a colorblind user, comprising:
    acquiring an electronic image corresponding to an actual image which can be viewed through a perspective display device;
    when a current processing mode is a first display mode, processing the electronic image to obtain a processed electronic image; and
    superimposing the processed electronic image on an actual image viewed through the perspective display device in a way of being aligned with the actual image and displaying it on the perspective display device;
    wherein the processing the electronic image comprises: conducting an HSV space transformation for a target part in the electronic image corresponding to an area of a color in the actual image which can not be distinguished,
wherein a way of the HSV space transformation comprises at least:

$y_1=2/3(360-x)+45, x\in[315,360)$;

$y_2=2/3x+45, x\in[0,45]$;

$y_3=5/6x+102.5, x\in[75,165]$;

wherein the range of the red hue is [315, 360] and [0, 45], the range of the green hue is [75, 165], $y_1$, $y_2$ and $y_3$ are the hues of the pixels of the target part in the processed electronic image, and x is the hue of a pixel of the target part in the electronic image.

11. The method as claimed in claim 10, wherein the processing further comprises marking the color of the target part with characters.

12. The method as claimed in claim 10, wherein the method further comprises: conducting reduction of 1-10 degrees of $y_1$, $y_2$ and $y_3$ in response to a received fine adjustment instruction of the user;
    and/or
    further comprises: adjusting the brightness and/or saturation in response to the received fine adjustment instruction of the user.

13. The method as claimed in claim 10, further comprising:
    when the current processing mode is a second display mode independent of other modes, processing the electronic image to obtain a processed electronic image; and
    superimposing the processed electronic image on an actual image viewed through the perspective display device in a way of being aligned with the actual image and displaying it on the perspective display device;
    wherein the processing the electronic image is: marking the color of the target part with characters.

14. The method as claimed in claim 11, wherein the characters are marked inside or outside an outline of the color in the target part.

15. The method as claimed in claim 10, wherein the method further comprises:
    tracing the convergence point of the lines of sight of the left and/or right eye of the user so as to determine the focal plane, such that the image acquisition device acquires an image of the focal plane, and performing coordinate matching for an image displayed by the perspective display device and an actual image viewed through it at least partially based on the positioned convergence point and the positioned pupil position of the user thereby aligning the two.

16. The method as claimed in claim 13, further comprising: in a case in which the current processing mode is the first display mode, the second display mode or a broadcast mode independent of the other modes,
    recognizing a color in the electronic image which can not be distinguished and outputting it to the user in the form of voice via a voice output device.

17. The method as claimed in claim 16, wherein the voice is outputted via a bone conduction headphone.

18. The method as claimed in claim 14, further comprising: recognizing different gestures of the user to recognize selection of the current processing mode by the user, so as to perform corresponding processing.

* * * * *